Oct. 4, 1938.    J. F. HIGBEE    2,132,029
DUAL WHEEL ASSEMBLY
Filed Sept. 28, 1936    4 Sheets-Sheet 2
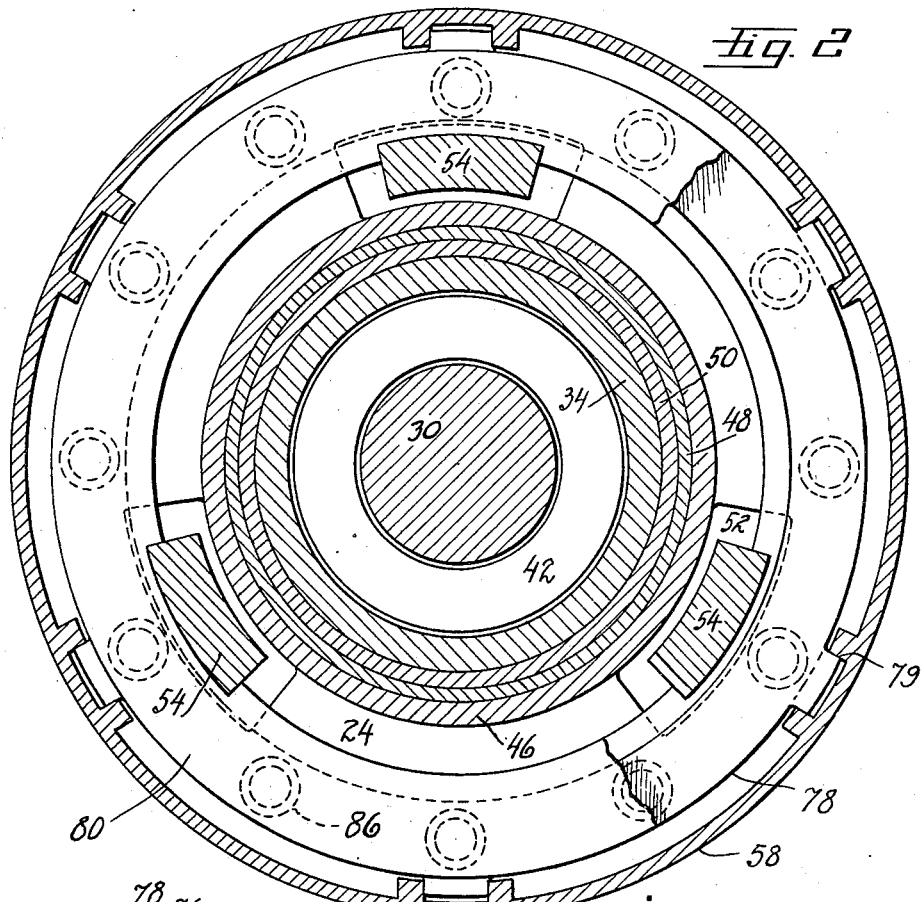
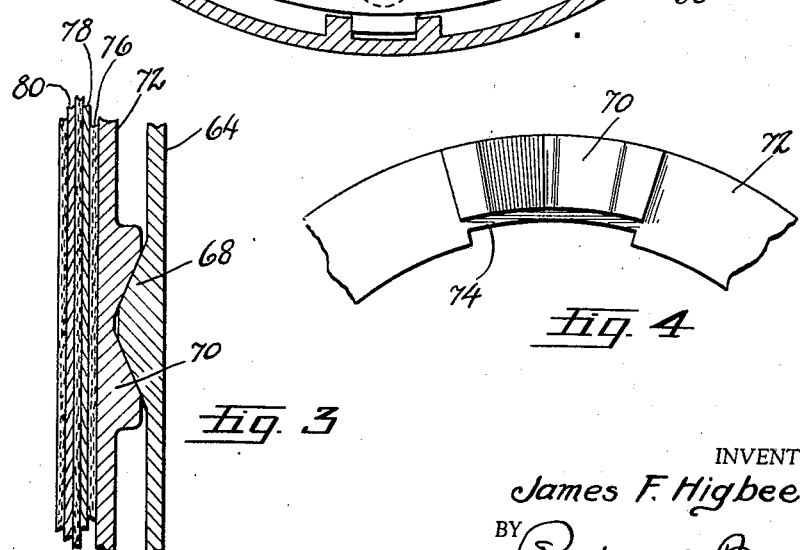
INVENTOR.
James F. Higbee
BY
Parker & Burton
ATTORNEYS.

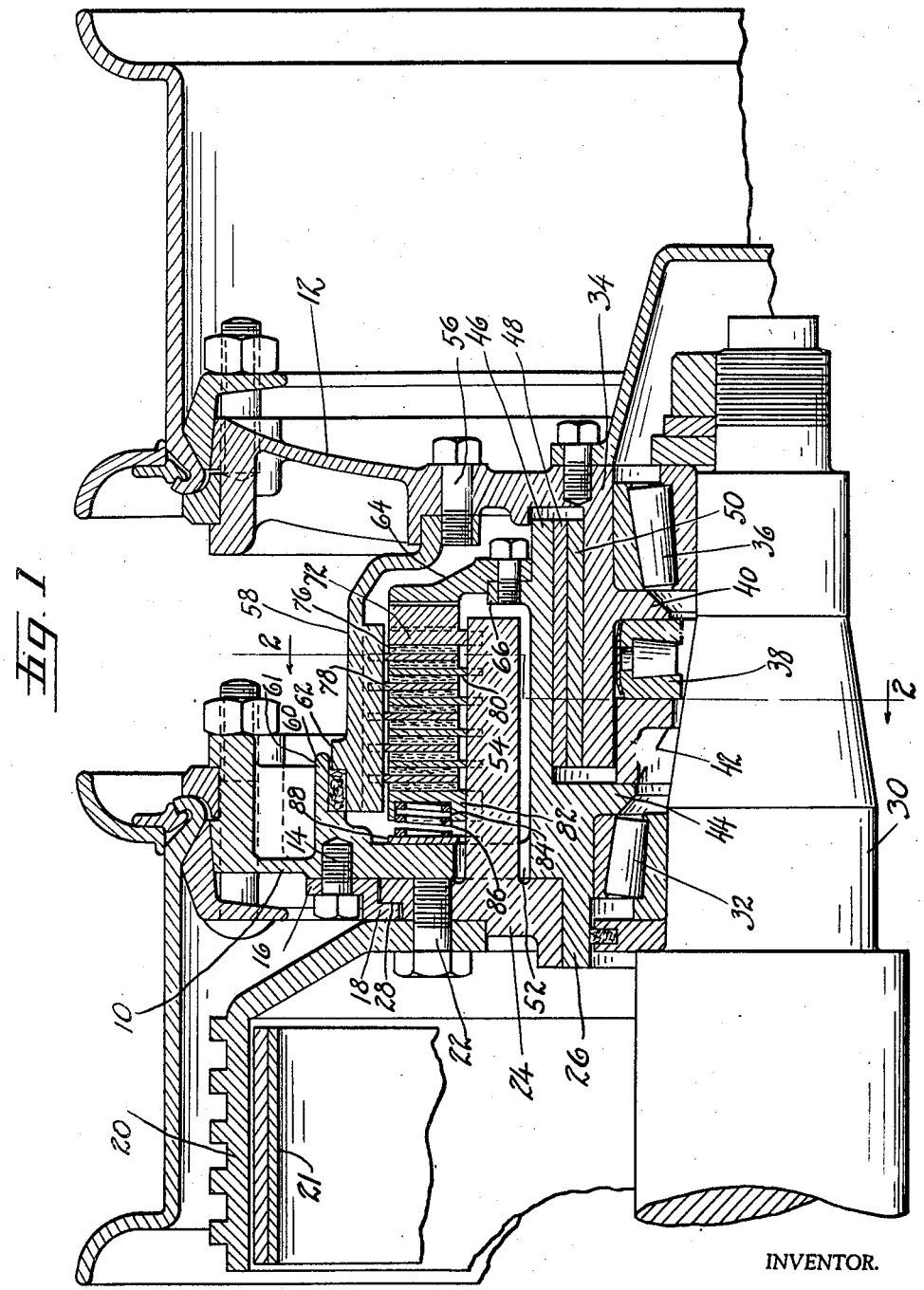

Oct. 4, 1938.  J. F. HIGBEE  2,132,029
DUAL WHEEL ASSEMBLY
Filed Sept. 28, 1936  4 Sheets-Sheet 3
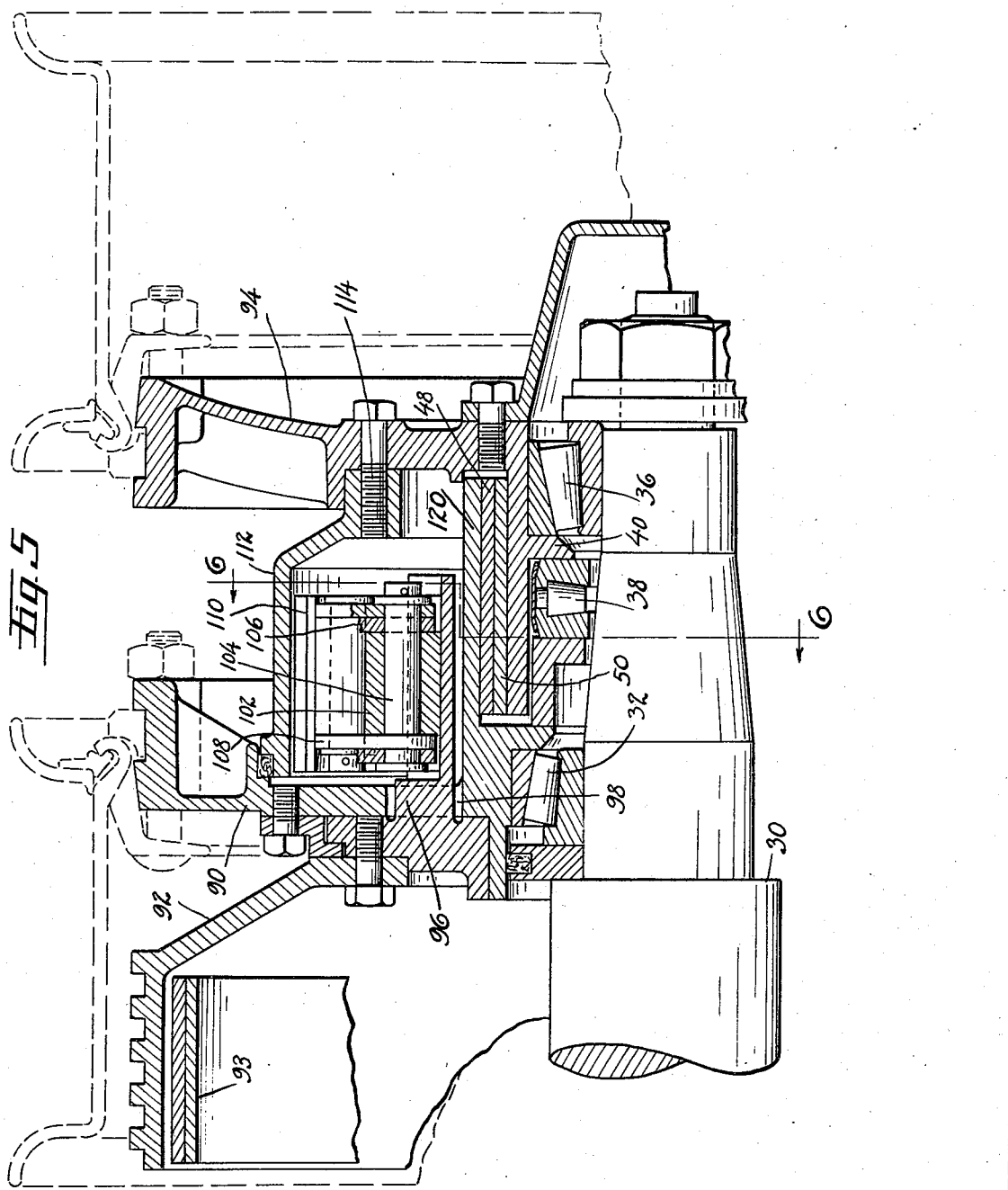
INVENTOR.
James F. Higbee
BY Parker & Burton
ATTORNEYS.

Oct. 4, 1938.  J. F. HIGBEE  2,132,029
DUAL WHEEL ASSEMBLY
Filed Sept. 28, 1936  4 Sheets-Sheet 4
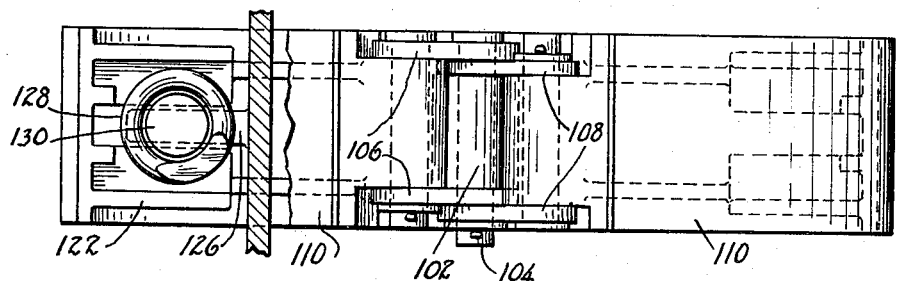
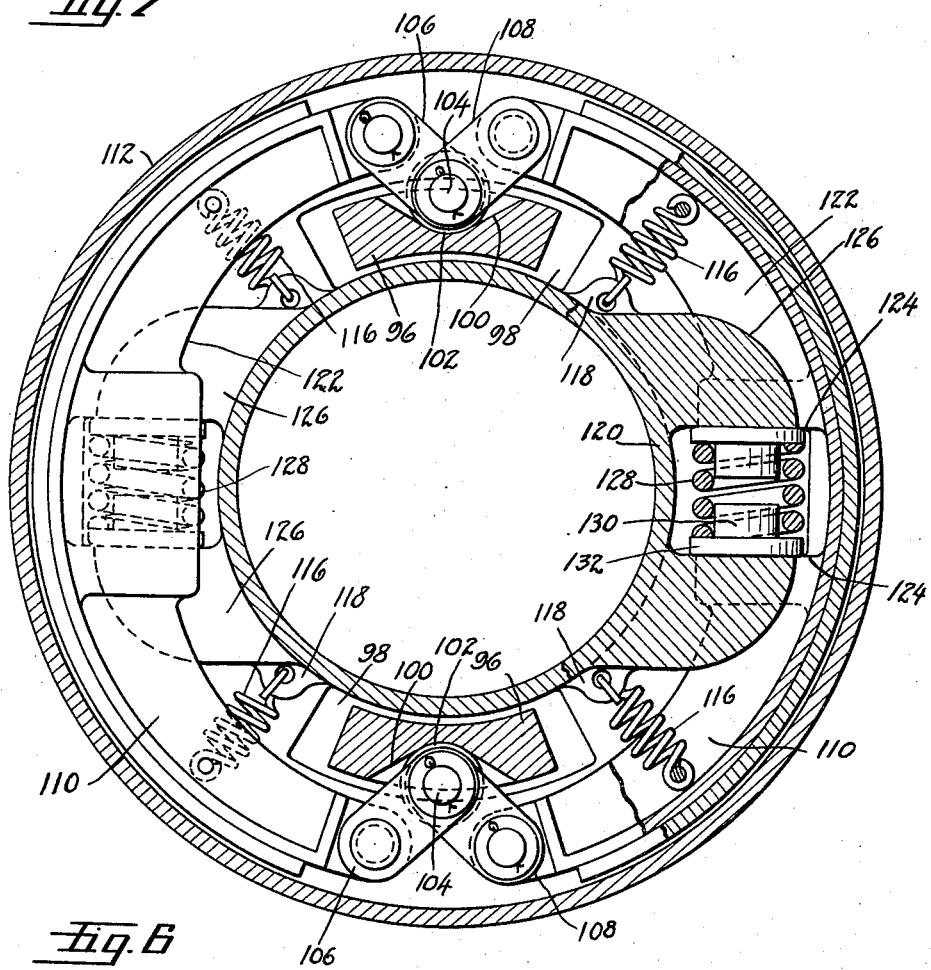
INVENTOR.
James F. Higbee
BY
Parker & Burton
ATTORNEYS.

Patented Oct. 4, 1938

2,132,029

UNITED STATES PATENT OFFICE 2,132,029

DUAL WHEEL ASSEMBLY

James F. Higbee, Detroit, Mich.

Application September 28, 1936, Serial No. 102,836

13 Claims. (Cl. 188—18)

My invention relates to dual wheel assemblies wherein each of the wheels is independently rotatable about its supporting spindle and has particular reference to brake mechanism associated with such an assembly.

An object of the invention is to secure an efficient braking action upon such wheels by providing a separate and improved independent brake for each of the wheels, the said brakes being so constructed that they may be operated substantially simultaneously upon application by the vehicle operator of the brake operating member customarily associated with automotive vehicles.

Another important object of the invention is the provision of improved braking mechanism associated with the outer of the dual wheels whereby a substantial braking torque may be applied therethrough for retarding purposes while at the same time eliminating any possibility of the outer wheel becoming locked and skidding. In this way the hazards normally associated with locked vehicle supporting wheels and the usual skidding resulting therefrom is eliminated.

Still a further object of the invention is to attain all of the advantages inherent in independently rotatable vehicle supporting dual wheels during the braking action. The possibility of providing a single brake or retarding means for the inner wheel and substantially simultaneously operable means for locking the two wheels together for simultaneous retardation of rotation will be apparent, but this invention contemplates the retention of the independently rotatable characteristic of the two wheels during the braking action. That is to say, an important feature of this invention resides in the fact that each of the wheels may continue to rotate independently of one another during the braking action. At the same time a substantial braking torque is being applied through each of the wheels through my improved brake mechanism and the effectiveness of such braking action is that of two independently rotatable road wheels independently braked. The maximum braking effort attainable through retardation of the two wheels is produced without the undesirable loss of independence of rotation of the wheels.

More particularly, an object is to provide in a dual wheel assembly of the character described brake friction means associated with each of the independently rotatable wheels. The brake friction means of the inner wheel is responsive to operation by the driver through a remote control device. The brake friction means associated with the outer wheel includes brake applying mechanism which is itself responsive to the application of the brake to the inner wheel. This brake applying device which actuates the brake friction means of the outer wheel brake is, in each of the two embodiments, shown as a cam member or element which responds to relative rotation of the inner wheel with respect to the brake drum.

More specifically an object of one embodiment of my invention is the provision of improved brake mechanism for independently rotatable dual wheels wherein the outer wheel is provided with a friction disc brake operable to retard rotation of the wheel in response to remote control over the inner wheel brake. In another embodiment the outer wheel is provided with expansible brake shoe mechanism of an improved type and wherein the brake shoe applying means is responsive to application of the brake to the inner wheel. An important feature is that application of the brake to the inner wheel actuates thrust mechanism which urges the brake friction means of the outer wheel into retarding engagement.

Various other objects and meritorious features of the invention which will be apparent from the following description taken in conjunction with the drawings wherein like numerals refer to like parts throughout the several figures and wherein:

Figure 1 is a sectional elevation of a preferred form of the invention,

Fig. 2 is a section through 2—2 of Fig. 1,

Fig. 3 is a plan view illustrating the secondary brake actuating mechanism,

Fig. 4 is a side elevation of the camming ring utilized therein,

Fig. 5 is a sectional elevation of a modified form of the invention,

Fig. 6 is a section through 6—6 of Fig. 5, and

Fig. 7 is a plan of the secondary brake structure shown in Fig. 6.

Referring now to the drawings, the numeral 10 represents the inner wheel of the dual assembly, with its respective rim, et cetera, and the numeral 12 represents the outer wheel of the dual assembly with its customary rim structure. Bolted to the inner wheel at circumferentially spaced points as indicated at 14 is a ring 16 which includes an offset depending flange 18. The brake drum 20 associated with the inner of the dual wheels is of substantially conventional structure and is bolted as indicated at 22 to an annular element 24, which annular element is rotatably journalled upon an inwardly extending flange 26 of the inner wheel member 10. Depending flange 18 seats in an annular pocket provided by the shoulder 28 at the radially outer edge of the annular ring 24. From the foregoing it will be apparent that the inner drum 20 and annular element 24 which is integrally secured thereto through bolts 22 are free to rotate with respect to the inner wheel 10, but such relative rotation is limited as hereinafter described. The inner wheel 10 is rotatably journalled upon the spindle 30 by means of rotary bearings 32.

The outer wheel 12 includes an inwardly extending hub portion 34 which is rotatably journalled upon spindle 30 by means of rotary bearings 36. A vertical thrust bearing 38 is positioned between flange 40 which extends inwardly from the hub 34 and a spacer ring 42 which bears against a second inwardly extending flange 44, which flange 44 is integral with the inner wheel 10.

The inner wheel 10 includes an outwardly extending hub portion 46 which is positioned in overlapped or telescoped relation to the hub portion 34 of the outer wheel 12. A hardened steel sleeve 48 is disposed within the hub 46 of the inner wheel and a similar hardened steel sleeve 50 is positioned over the hub 34 of the outer wheel. Sleeve 48 is telescoped over sleeve 50 and thereby provides substantial bearing surfaces which permit independent rotation of the two wheel hubs and their respective wheels.

At circumferentially spaced points the inner wheel 10 is provided with arcuate slots 52 (Fig. 2) through which correspondingly arcuate projections 54, integral with the annular element 24, which carries the brake drum 20, extend. These slots 52 are oversize the arcuate projections 54. It may be pointed out at this stage that the limited movement of the projections 54 within the slots 52 upon rotation of the ring 24 relative to the inner wheel 10 determines the permitted relative rotation of the inner wheel brake drum 20 with respect to the inner wheel 10 with which such drum is associated.

The outer wheel 12 has bolted to the inner side thereof, as indicated at 56, a housing member 58 which overlies the space between the wheels as clearly indicated in Fig. 1. A packing gland 60 positioned by means of a shoulder 62 extending around the outside of the housing 58 and by a flange 61 on inner wheel 10 provides a seal preventing the ingress of dust or dirt into the housing 58. The above described structure resembles generally that shown in my Patent No. 2,001,875, dated May 21, 1935.

An annular cam ring 64 is bolted to a radially projecting flange 66 (Fig. 1) associated with the hub 46 of the inner wheel 10. This camming ring is provided with circumferentially spaced apart cam faces 68 (Fig. 3) which cooperate with reversely tapered cam surfaces 70, which cam surfaces 70 are integral parts of an annular thrust ring 72. This ring 72 is provided with cut away portions 74 (Fig. 4) whereby the said ring 72 is keyed upon the arcuate projections 54 of the ring 24.

The plurality of friction discs 78 and 80 are keyed alternately to the housing 58 carried by the outer wheel 12 and the projections 54 of the ring 24, which ring carries the inner wheel brake drum 20. Discs 78 are keyed as at 79 (Fig. 2) to the housing 58 and discs 80 are keyed as shown in the same figure to the projections 54 of the ring 24. These discs are keyed to their respective supporting parts to rotate therewith while having permitted movement toward and away from each other axially of the wheel assembly. Certain of these discs, such as disc 78, may be provided on opposite faces with suitable friction facing material 76 as shown in Fig. 1.

A second thrust ring 82 is keyed to the projection 54 at the end of the disc assembly opposite the thrust ring 72. This thrust ring 82 is provided with a plurality of circumferential spaced apart recesses 84 for positioning coil springs 86. The opposite ends of the coil spring bear against an annular thrust plate 88, which thrust plate is likewise connected to the projections 54 abutting the inner wheel 10 as shown in Fig. 1. This thrust ring 82 has permitted movement toward and away from the friction discs. These brake discs 78 and 80 constitute brake friction means for the outer wheel.

The operation of the mechanism will now be set forth. As indicated in Fig. 1 the coil springs 86 are rather heavy and when the brakes are off these springs are not under compression, sufficient clearance being provided between the friction plates 78 and 80 to avoid any substantial rubbing between the faces thereof due to the independent rotation of the wheels.

Upon application of the brake friction element 21 the inner drum 20 of said drum and its associated ring 24 will be retarded while the inner wheel 10 continues to rotate or overrun the drum at its former rate of speed. The permitted relative movement between the drum assembly 20 and the inner wheel assembly 10 is very small and the inner wheel will be retarded along with the drum 20, as soon as the projections 54 have reached the ends of slots 52. During this relative rotation between the inner drum and its wheel the cam ring 72 which is keyed to the projections 54 will have rotated a corresponding distance with respect to the cam ring 64 which is secured to the inner wheel. During this relative movement between the rings 72 and 64 the cam faces 70 and 68 riding over each other will urge the ring 72 inwardly to urge the friction discs together and against the resistance of the coil springs 86, thereby retarding the discs 78 which are keyed to the housing 58 and consequently retarding the rotation of the outer wheel 12 to which the housing 58 is secured. It will be seen that the friction discs 78 rotate with the outer wheel and the friction discs 80 and cam ring 72 with the inner wheel brake drum and the cam ring 64 with the inner wheel and frictional compression of said discs tends to equalize such rotation. It is not intended, however, to lock such outer wheel against rotation.

It will be apparent that the friction discs 78 and 80 can only be compressed an amount equal to the maximum camming action which can be secured between the cam faces 68 and 70 of rings 64 and 72 respectively. These faces are so proportioned as to length and camming action that the friction discs will never serve to lock the wheels together for rotation in unison. The friction discs simply function to create a retarding effect or braking action, short of immobility, on the outer wheel 12 during the time that the inner wheel is being braked through drum 20 in the customary manner. Wear of the friction facings associated with the friction discs 78 and 80 may be taken up by the insertion of a second ring similar to ring 88 after a determined wear on said facings.

Another form of the dual wheel brake has been illustrated in Figs. 5, 6, and 7. In this modification the brake for the outer wheel is embodied in a pair of secondary brake shoes, which brake shoes are expansible against a secondary drum associated with the outer wheel. The outer wheel and drum are of similar construction to that heretofore described. A certain amount of wrap of the secondary shoes along with the rotation of the secondary drum is permissible against a yielding resistance.

Referring now to the specific modified structure disclosed, the inner wheel assembly 90, the inner drum assembly 92, and the outer wheel assembly 94 are substantially the same as the corresponding parts described in the preferred form of Figs. 1, 2, 3, and 4. The inner drum assembly includes a pair of diametrically opposed arcuate projections 96 extending through slots 98 in the inner wheel. The outer surface of each projection 96 is concaved as indicated at 100 (Fig. 6) to provide a cam seat for a roller 102. These rollers are mounted on pins 104, which pins likewise function to connect the arms 106 and 108 of toggles which connect the adjacent ends of secondary brake shoes 110.

A secondary brake drum 112 is secured integrally to the outer wheel 94 as indicated at 114 and the toggle arrangement hitherto described is adapted to force these secondary shoes 110 radially outwardly against said secondary drum. Retraction springs 116 are connected to ears 118 projecting from the hub portion 120 of the inner wheel assembly and with the shoes 110 to withdraw the shoes upon release of the brakes following application thereof. The brake shoes 110 are of channel shape in cross section, the walls 122 of the channel being cut away as indicated at 124 intermediate their ends to provide a notch equal in extent to the distance between the ears 126 projecting radially outwardly from the hub portion 120 of the inner wheel. Coil springs 128 are seated about studs 130, which studs are provided with heads 132 adapted to bear against the aligned ears 126 and the cut away portions 124 of the walls of the brake shoes. It will be apparent that these coil springs, while they permit a limited amount of relative rotation between the shoes and the ears 126 of the wheel, function generally to center the shoes with reference to the ears upon release of the brakes.

The operation of this modified form of structure will be apparent. Upon application of the brake friction means 93 to the inner wheel drum 92 there will result a certain amount of relative rotation between the drum 92 and inner wheel 90 as the inner wheel 90 tends to overrun its retarded drum. The secondary brake shoe 110 of the outer wheel brake being normally centered and positioned with reference to the inner wheel by means of ears 126, relative rotation of the drum 92 with respect to the inner wheel upon overrunning of said drum by the wheel will, through arcuate projections 96, force the toggle arms 106 and 108 outwardly as the roller 102 rides up on the projections 96.

Sufficient expansion of the secondary shoes 110 will have occurred by the time the projections 96 reach the limit of their movement in slots 98 to apply a substantial braking action against the secondary drum. Inasmuch as the secondary shoes are free to wrap to a certain extent with the projections 96, the application of the secondary shoes will never be sufficient to lock the outer drum 112 with respect to the said secondary shoes, thereby insuring continued independent rotation of the outer and inner wheels. At the same time, wear on the friction facings of the secondary shoes is automatically compensated for by the fact that the rollers 102 can ride further and further out on the cam faces of the projections 96 to apply the secondary shoes. The entire secondary assembly will be released and centered by means of the springs 128 and 116 upon release of the brakes applied to the inner drum. Both application and release of the brakes associated with each of the respective wheels is substantially simultaneous. In each construction, that of Figs. 1 to 4 and that of Figs. 5 to 7, it will appear that there is a cam element, ring 64 in Fig. 1 and projection 96 in Fig. 6, which in response to relative rotation between the inner wheel and its drum actuates thrust means, thrust ring 72 in Fig. 1 and the toggle mechanism in Fig. 6, to thrust the brake friction means of the outer wheel into retarding engagement.

Various other modified forms of structure involving the basic ideas herein disclosed will be apparent to those skilled in the art, and I wish for that reason to be limited only by the scope of the appended claims.

What I claim:

1. In combination with a pair of independently rotatable vehicle supporting dual wheels, retarding means associated with the inner of said wheels, friction discs arranged intermediate said wheels operable to retard rotation of the outer wheel, and means automatically operable upon retardation of the inner wheel to operate said friction discs.

2. In combination with a pair of independently rotatable vehicle supporting dual wheels, a brake drum associated with the inner wheel to permit slight relative rotation therebetween, friction discs associated with the outer wheel operable to retard rotation of the same, and means operable upon relative movement of said drum to its respective wheel to compress said friction discs.

3. In combination with a pair of independently rotatable vehicle supporting dual wheels, a brake drum associated with the inner wheel, friction discs positioned by said outer wheel, friction discs interleaved with said first mentioned friction discs positioned by said inner wheel and drum assembly, and means for compressing said friction discs to retard rotation of the outer wheel upon application of retarding means to the inner wheel drum.

4. In combination with a pair of independently rotatable wheels arranged side by side upon a common spindle, a brake drum associated with the inner wheel, retarding means associated with said drum, interleaved friction discs secured to said outer wheel and inner wheel assembly respectively operable upon compression to retard rotation of said outer wheel.

5. In combination with a pair of independently rotatable dual wheels, a brake drum associated with the inner wheel, a housing associated with the outer wheel and extending axially toward the inner wheel, interleaved friction discs positioned respectively by said housing and the inner wheel and drum assembly, cam mechanism for compressing said discs to secure retardation of said outer wheel.

6. Mechanism of the class described including, in combination, a pair of wheels mounted for independent rotation in juxtaposed relation, one of said wheels provided with arcuate slots, a brake drum rotatably positioned by said wheel and including laterally extending members provided with cam faces and projecting through said arcuate slots, retarding means associated with the other of said wheels, and means cooperating with said cam faces operable to actuate said retarding means upon relative movement of said laterally projecting member with reference to the inner wheel.

7. Mechanism of the class described comprising independently rotatable dual wheels, a brake drum rotatably positioned by one of said wheels, said wheel provided with arcuate slots, members integral with said brake drum extending through said slots, a housing secured to the other wheel and extending in overlapped relation to said members, interleaved friction discs positioned respectively by said members and said housing, and means operable by said members upon movement of said brake drum with respect to its associated wheel for compressing said discs.

8. Mechanism of the class described comprising independently rotatable dual wheels, a brake drum rotatably positioned by one of said wheels, said wheel provided with an arcuate slot, a member integral with said brake drum extending through said slot, a housing secured to the other wheel and extending in overlapped relation to said member, interleaved friction discs positioned respectively by said member and said housing, and cam means operable by said member upon movement of said brake drum with respect to its associated wheel for compressing said discs.

9. Mechanism of the class described comprising independently rotatable dual wheels, a brake drum rotatably positioned by one of said wheels, said wheel provided with arcuate slots, members integral with said brake drum extending through said slots, a housing secured to the other wheel and extending in overlapped relation to said members, expansible friction shoes floatingly supported within said housing, and means coupled therewith operable by said member to expand the same upon rotation of said drum relative to its associated wheel.

10. Mechanism of the class described comprising independently rotatable dual wheels, a brake drum rotatably positioned by one of said wheels, said wheel provided with an arcuate slot, a member integral with said brake drum extending through said slot, a housing secured to the other wheel and extending in overlapped relation to said member, a pair of friction shoes floatingly supported within said housing, a toggle arm connecting the ends of said friction shoes and abutting said member whereby said shoes are expanded against said housing upon movement of said member with respect to said toggle.

11. Mechanism of the class described comprising independently rotatable dual wheels, a brake drum rotatably positioned by one of said wheels, said wheel provided with a slot, a member integral with said brake drum extending through said slot, a housing secured to the other wheel and extending in overlapped relation to said member, friction means within said housing yieldably centered with relation to said first mentioned wheel, expanding means coupling said friction shoes and normally abutting said member whereby rotation of said member with respect to its associated wheel expands said friction shoes.

12. In combination with a pair of wheels positioned in juxtaposed relation for independent rotation, a brake drum rotatably associated with one of said wheels, said wheel having an arcuate slot, a brake actuating member fixed to said drum extending through said slot, said member including a cam surface upon its radially outermost face.

13. Mechanism of the class described including, in combination, a pair of wheels mounted for independent rotation in juxtaposed relation, one of said wheels provided with arcuate slots, a brake drum rotatably positioned by said wheel and including laterally extending members projecting through said arcuate slots, retarding means associated with the other of said wheels, said projecting members each having a recessed V-shaped cam face, and means engaging each of said cam faces and normally positioned in the bottom of the recess, said last means operable to ride up one of the inclined sides of said cam recess and actuate said retarding means upon relative movement of the projecting members with reference to the wheel provided with the arcuate slots.

JAMES F. HIGBEE.